Aug. 11, 1931.  J. B. MacNAMEE  1,818,900
AUTOMATIC SCISSORS OR SHEARS
Filed Feb. 18, 1930

Inventor
Joseph B. MacNamee
by his Attorneys.
Howson & Howson

Patented Aug. 11, 1931

1,818,900

UNITED STATES PATENT OFFICE

JOSEPH B. MacNAMEE, OF LLANERCH, PENNSYLVANIA

AUTOMATIC SCISSORS OR SHEARS

Application filed February 18, 1930. Serial No. 429,240.

The present invention relates broadly to scissors or shears and particularly refers to scissors which may be operated by power-driven mechanism.

The principal object of the invention is to provide a removable or detachable casing containing a shear operating mechanism embodying a flexible rotating power shaft adapted to be driven by an electric motor, and suitable gearing whereby power from said shaft may be communicated to the cutting blades of shears placed in the casing for reciprocating them.

Another object is to provide means on the casing whereby the size of the cut of the shears may be easily adjusted to any practical degree desired.

A further object is to provide a removable casing within which is located all the driving mechanism essential to the operation of the shears and into which may be inserted a standard pair of manually-operable shears and thereby converted into power-driven shears or scissors.

A further object is to provide a casing into which a pair of manually-operable shears may be easily inserted without necessitating any change in the construction of the shears and which may be easily removed for purposes of cleaning or grinding and may be replaced by another pair.

Other objects and advantages will appear more fully hereinafter from the following detailed description taken together with the drawings, in which.

It is well-known that, broadly, mechanically-operated or power-driven scissors and shears are old, but none of the prior art devices provide a construction such as disclosed in the present invention which provides a casing containing the driving mechanism which is adapted to operate with an ordinary standard manually-operable pair of shears or scissors which may be inserted into and removed from the casing at will. Practically all of the devices of the prior art require a special construction of the shears or scissors which are made a permanent part of the mechanism and in order to grind the shears, the entire device including the mechanism has to be dispensed with temporarily. By providing a casing in accordance with my invention, the shears may be easily removed and ground or repaired and replaced by another pair of shears to be used while the first pair is being repaired or ground. The advantage of this feature is the fact that only one casing is necessary which may be used with any standard manually-operable pair of shears or scissors. The construction is very simple and economical to manufacture, having but few parts readily accessible for repair and replacement when necessary.

Figure 1:
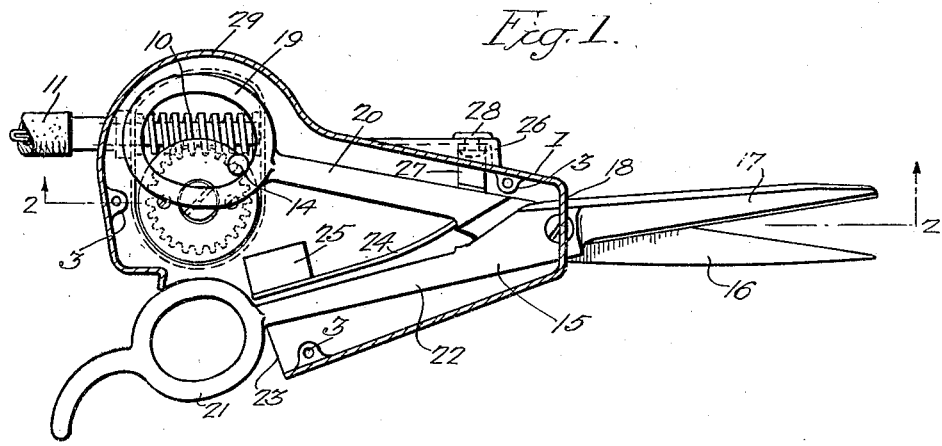
Fig. 1 is a top view of the casing with a pair of shears inserted therein for operation.

Referring to Fig. 1 of the drawings, the device comprises the lower section 1 of the casing which is so formed as to comfortably fit the hand of the user. The upper section or cover 2 (Fig. 2) of the casing is adapted to coincide and fit the lower section 1 and may be attached thereto by means of the lugs 3 and the screws 4. The lower section 1 of the casing is provided with an auxiliary compartment 5 in which is located a gear 6 pivotally mounted by means of the bushing 7 through which passes the bolt 8 which holds the gear 6 in the compartment 5 by means of the nut 9. The gear 6 is adapted to be engaged by the worm 10 on the flexible power-driven shaft 11 which may be driven by an electrical motor (not shown). Secured to the gear 6 by means of the screws 12 is a wheel 13 on which is eccentrically located a pin 14. The auxiliary compartment 5 is offset to one side of the casing at one end thereof so that when a pair of shears 15 are inserted into the casing with the cutting blades 16 and 17 projecting out of the casing through an opening 18, the pin 14 is adapted to engage the finger-receiving portion 19 on the haft 20 which is integral with the cutting blade 16 and thereby actuating the blade as the wheel 13 rotates. The other finger-receiving portion 21 on the haft 22 is adapted to project from the casing through the opening 23 so that the operator may insert a finger therein to enable him to control the blade 17. A spring member 24 is attached to the casing at 25 and is so positioned as to bear against the haft 20, thereby normally holding the blades 16 and 17 in open position. On one side of the casing is provided a projection 26 adapted to hold in slidable relation a control member 27 which bears against the haft 20. The control member 27 is adapted to be removed by the button 28 which is readily accessible to the thumb of the operator. The object of the control member 27 is to limit the movement of the haft 20, thereby limiting the size of the cut which may be made by the blades 16 and 17. As shown in Fig. 1, the control member 27 is in a position which affords a maximum movement of the haft 20. When the member 27 is moved to the left by means of the button 28, the haft 20 is moved closer to the haft 22, thereby making the opening of the blades 16 and 17 smaller and the cut shorter.

The operation of the device may be summarized as follows:—The casing, with the shears 15 properly located therein, may be grasped by the operator so that one of his fingers enters the finger-receiving element 21 and his thumb grasps the portion 29 of the casing. Power is applied to the flexible shaft 11 by means of an electric motor (not shown) which may be controlled by a switch (not shown). As the shaft 11 rotates, rotating therewith the pinion 10, the gear 6 is engaged by the pinion 10 and caused to rotate on the bushing 7. The wheel 13, being fixed to the gear by means of the screws 12, is caused to rotate with the gear whereby the pin 14 actuates the finger portion 19, thereby moving the haft 20 against the tension of the spring 24 to close the cutting blade 17 against cutting blade 16. As the pin traverses an arc of 180°, the haft 20 is moved away from the haft 22 by means of the spring 24. The finger portion 21 of haft 22 must be held against the casing with the finger to hold it rigid. The finger-receiving portion 21 projecting out of the casing is provided so that if the cutting blades 16, 17 should be jammed while cutting, the blades may be easily opened by moving the blade 17 by means of the finger-receiving portion 21. The size of the cut may be easily controlled by the operator by simply moving his thumb from the portion 29 to the button 28 and setting the control element 27 to the desired position on the haft 20.

Figure 2:
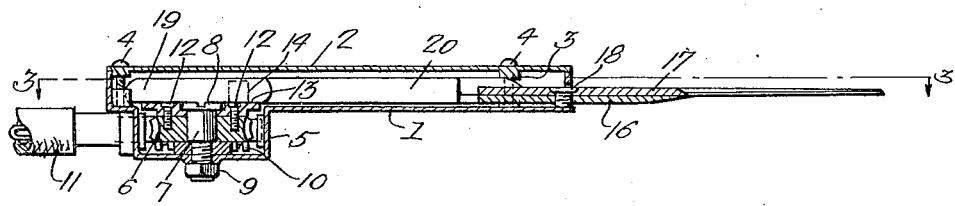
Fig. 2 is a sectional view taken on the line 2—2 of Fig. 1.
Figure 3:
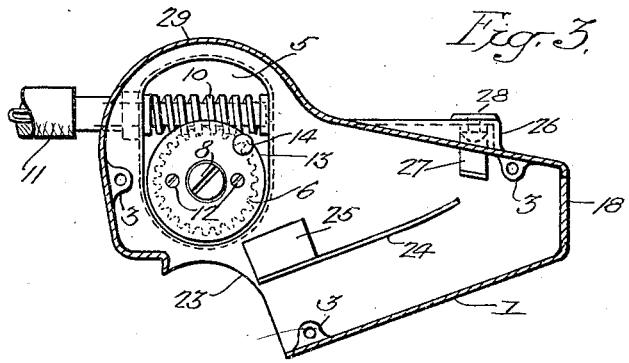
Fig. 3 is a sectional view taken on line 3—3 of Fig. 2 with the shears removed.

It will be apparent from the construction shown in Figs. 1 to 3 that the shears 15 may be easily and quickly removed from the casing by lifting the finger portions 19 and 21 and withdrawing the blades 16 and 17 from the opening 18 in the casing and may be replaced by another pair of shears and then secured in place by means of the cover portion 2 which forms a closed housing with the lower portion 1 of the casing.

While I have shown only one embodiment of my invention for the purposes of illustration and description, other changes and modifications may be apparent therein to those skilled in the art without departing from the scope of the invention and I, therefore, desire to be limited only by the scope of the appended claims.

I claim:

1. The combination with a pair of standard, manually-operable shears, of a casing into which said shears are adapted to be removably inserted, means within said casing for actuating said shears whereby they are converted into power-operated shears, and means on said casing for adjusting the amount of opening of said shears.

2. The combination with a pair of standard, manually operable shears of the scissors type comprising a pair of pivotally attached members having blade, shank and finger receiving portions, of a casing into which said shears are adapted to be removably inserted, means within said casing for actuating said shears, whereby they are converted into power operated shears, and means cooperating with one of the shanks for adjusting the amount of opening of said shears.

3. The combination with standard, manually-operable shears, of a detachable casing adapted to receive said shears with their cutting blades projecting outward from the interior thereof, resilient means adapted to engage one of the hafts of said shears to normally maintain said blades in open relation, finger-receiving portions on the hafts of said shears, a rotatable disk having an eccentrically located pin thereon adapted to engage one of said finger-receiving portions and through rotation of said disk to actuate one of said blades against the other, a power transmission shaft extending into said casing, a worm driven by said shaft, and a gear in operative relation with said worm and associated with said disk for operating the latter.

4. The combination with standard, manually-operable shears, of a detachable casing adapted to receive said shears with their cutting blades projecting outward from the interior thereof, resilient means adapted to engage one of the hafts of said shears to normally maintain said blades in open relation, finger-receiving portions on the hafts of said shears, a rotatable disk having an eccentrically located pin thereon adapted to engage one of said finger-receiving portions and through rotation of said disk to actuate one of said blades against the other, a power transmission shaft extending into said casing, a worm driven by said shaft, and a gear in operative relation with said worm and associated with said disk for operating the latter, the other of said finger-receiving portions adapted to project out of said casing through an opening therein and positioned in an arcuate recess on the exterior of said casing whereby the other of said blades may be held stationary.

5. The combination with standard, manually-operable shears, of a detachable casing adapted to receive said shears with their cutting blades projecting outward from the interior thereof, resilient means adapted to engage one of the hafts of said shears to normally maintain said blades in open relation, finger-receiving portions on the hafts of said shears, a rotatable disk having an eccentrically located pin thereon adapted to engage one of said finger-receiving portions and through rotation of said disk to actuate one of said blades against the other, a power transmission shaft extending into said casing, a worm driven by said shaft, and a gear in operative relation with said worm and associated with said disk for operating the latter, the other of said finger-receiving portions adapted to project out of said casing through an opening therein whereby the other of said blades may be manually operated when said first blade is rendered ineffective.

6. The combination with standard, manually-operable shears, of a detachable casing adapted to receive said shears with their cutting blades projecting outward from the interior thereof, resilient means adapted to engage one of the hafts of said shears to normally maintain said blades in open relation, finger-receiving portions on the hafts of said shears, a rotatable disk having an eccentrically located pin thereon adapted to engage one of said finger-receiving portions and through rotation of said disk to actuate one of said blades against the other, a power transmission shaft extending into said casing, a worm driven by said shaft, a gear in operative relation with said worm and associated with said disk for operating the latter, the other of said finger-receiving portions adapted to project out of said casing through an opening therein and positioned in an arcuate recess on the exterior of said casing whereby the other of said blades may be held stationary, and means on said casing adapted to bear against the haft of said actuating blade for adjusting the relative opening between said blades.

7. Shears comprising a detachable two-part casing, one of said parts having an arcuate recess at one end thereof with an opening leading into said casing, another opening at the other end of said casing, the second part of said casing comprising a removable cover therefor, pivoted relatively reciprocable cutting blades projecting outward from the interior of said casing through said second opening, resilient means normally maintaining said blades in open relation, rear end extensions or hafts having finger-receiving portions carried by said blades interiorly of said casing, one of said finger-receiving portions adapted to project outward of said casing through said first opening into said arcuate recess thereby one of said blades is adapted to be manually operated when the other is rendered inoperative, a flexible rotary power shaft extending into said casing and having a worm thereon, a gear rotatably mounted in said casing and meshing with said worm to be rotated thereby, a disk rotatable with said gear and having an eccentrically located pin thereon disposed for actuating the other of said blades against the tension of said resilient means, and adjustable means on one edge of said casing for controlling the relative opening between said blades.

JOSEPH B. MacNAMEE.